United States Patent
Chung et al.

(10) Patent No.: US 7,035,186 B2
(45) Date of Patent: Apr. 25, 2006

(54) OPTICAL PICKUP FOR DETECTING THICKNESS VARIATION OF A RECORDING MEDIUM, AND/OR COMPENSATING FOR SPHERICAL ABERRATION CAUSED BY THICKNESS VARIATION OF A RECORDING MEDIUM

(75) Inventors: Chong-sam Chung, Gyeonggi-do (KR); Young-man Ahn, Gyeonggi-do (KR); Tae-kyung Kim, Seoul (KR); Hae-jung Suh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 09/985,767

(22) Filed: Nov. 6, 2001

(65) Prior Publication Data

US 2002/0114240 A1    Aug. 22, 2002

(30) Foreign Application Priority Data

Dec. 28, 2000  (KR) .............................. 2000-84211

(51) Int. Cl.
 *G11B 5/58* (2006.01)
(52) U.S. Cl. .............................. 369/53.22; 369/112.01
(58) Field of Classification Search ............ 369/44.32, 369/44.41, 53.12, 53.13, 53.14, 53.2, 53.22, 369/53.23, 112.01, 112.02, 112.16, 112.17, 369/120, 121, 124.12
See application file for complete search history.

(56) References Cited

U.S. PATENT DOCUMENTS

| | | | |
|---|---|---|---|
| 4,920,527 A | 4/1990 | Maeda | |
| 5,841,754 A * | 11/1998 | Lee et al. | ............... 369/112.13 |
| 6,353,582 B1 | 3/2002 | Kikuchi | |
| 6,510,111 B1 * | 1/2003 | Matsuura | .................. 369/44.32 |
| 6,730,896 B1 * | 5/2004 | Yamada | .................... 250/201.5 |

FOREIGN PATENT DOCUMENTS

| | | |
|---|---|---|
| JP | 2000-57616 | 2/2000 |
| JP | 2000-182254 | 6/2000 |
| WO | WO 00/39792 | 7/2000 |

OTHER PUBLICATIONS

Chinese Office Action in corresponding Chinese Application.

* cited by examiner

*Primary Examiner*—Paul W. Huber
(74) *Attorney, Agent, or Firm*—Stein, McEwen & Bui, LLP

(57) ABSTRACT

An optical pickup for a recording medium includes a light beam division and detection unit including receiving portions dividing an incident light beam reflected on the recording medium into a first light beam portion and a second light beam portion around the first light beam portion and converting the first and second light beam portions into first and second detection signals, respectively. A thickness variation detection circuit detects a variation in thickness of the recording medium according to the first and second detection signals and outputs a thickness variation signal indicative thereof.

24 Claims, 12 Drawing Sheets

(t'=0.7mm)

(t'=0.65mm)

(t'=0.60mm)

THICKNESS VARIATIONS OF RECORDING MEDIUM

THICKNESS VARIATIONS OF RECORDING MEDIUM

OPTICAL PICKUP FOR DETECTING THICKNESS VARIATION OF A RECORDING MEDIUM, AND/OR COMPENSATING FOR SPHERICAL ABERRATION CAUSED BY THICKNESS VARIATION OF A RECORDING MEDIUM

CROSS-REFERENCE TO RELATED APPLICATIONS

This application claims the benefit of Korean Application No. 2000-84211, filed Dec. 28, 2000, in the Korean Industrial Property Office, the disclosure of which is incorporated herein by reference.

BACKGROUND OF THE INVENTION

1. Field of the Invention

The present invention relates to an optical pickup apparatus, and more particularly, to an optical pickup for detecting thickness variation of a recording medium, and/or for compensating for spherical aberration caused by the thickness variation of a recording medium.

2. Description of the Related Art

In general, information recording/reproduction density increases as a size of a light spot focused on a recording medium in an optical pickup apparatus becomes smaller. The shorter a wavelength ($\lambda$) of light used and the larger a numerical aperture (NA) of an objective lens, the smaller the size of a light spot, which is expressed by equation (1):

$$\text{size of light spot} \propto \lambda/\text{NA} \quad (1)$$

To reduce the size of the light spot focused on the recording medium in order to obtain a higher recording density, there is a need to construct an optical pickup with a short wavelength light source, such as a blue semiconductor laser, and an objective lens having a larger NA. A format for increasing recording capacity up to 22.5 GB with a 0.85-NA objective lens, and for reducing the thickness of a recording medium to 0.1 mm is desired so as to prevent degradation of performance caused by tilting of the recording medium. Here, the thickness of the recording medium is defined as a distance from a light incident surface of the recording medium to an information recording surface.

As shown in equation (2) below, an spherical aberration W is proportional to a fourth power of the NA of the objective lens and to a deviation of the thickness of the recording medium. For this reason, if an objective lens with a high NA of about 0.85 is adopted, the recording medium must have a uniform-thickness with a deviation less than ±3 µm. However, it is very difficult to manufacture the recording medium within the above thickness deviation range.

$$W_{[40]} = \frac{n^2 - 1}{8n^3}(NA)^4 \Delta d \quad (2)$$

FIG. 1 is a graph showing a relation between thickness deviation of the recording medium and wavefront aberration (optical path difference (OPD)) caused by a thickness deviation when a 400-nm light source and an objective lens having an NA of 0.85 are used. As shown in FIG. 1, the wavefront aberration increases proportionally with the thickness deviation. Thus, when the objective lens having a high NA, for example, an NA of 0.85, is adopted, there is a need to correct for spherical aberration caused by the thickness deviation of the recording medium.

FIG. 2 shows a conventional optical pickup capable of detecting variation of the thickness of an optical disc 1, which is disclosed in Japanese Patent Laid-open Publication No. hei 12-57616. Referring to FIG. 2, the conventional optical pickup includes a light source 10 emitting a light beam, a polarization beam splitter 11 transmitting or reflecting the light beam from the light source 10 incident on the optical disc 1 according to the polarization of the light beam, and a quarter-wave plate 15 changing the polarization of an incident light beam. An objective lens 17 focuses the incident light beam to form a light spot on a recording surface 1a of the optical disc 1. A cylindrical astigmatism lens 21 has an astigmatism affecting the light beam passed back through the objective lens 17, the quarter-wave plate 15, and the polarization beam splitter 11 after being reflected from the recording surface 1a of the optical disc 1. A photodetector 25 receives the light beam from the astigmatism lens 21. The conventional optical pickup further includes a collimating lens 13 disposed between the polarization beam splitter 11 and the quarter-wave plate 15, collimating an incident diverging light beam from the light source 10 transmitted or reflected by the polarization beam splitter 11. A condensing lens 19 is disposed between the polarization beam splitter 11 and the astigmatism lens 21. The polarization beam splitter 11, the collimator lens 13, the quarter-wave plate 15, the objective lens 17, the condensing lens 19, and the cylindrical astigmatism lens 21 are coaxially arranged.

Because the conventional optical pickup has the astigmatism lens 21 which causes astigmatism to enable focus error signal detection, the intensity distribution of the light passed through the astigmatism lens 21 after being reflected on the recording surface 1a of the optical disc 1 varies according to the thickness t' of the optical disc 1, as shown in FIGS. 3A through 3E. FIGS. 3A through 3E illustrate an intensity distribution of light passed through the astigmatism lens 21 towards the photodetector 25, when the optical disc 1 adopted has a thickness of 0.70 mm, 0.65 mm, 0.60 mm, 0.55 mm, and 0.50 mm, respectively, and the optical pickup of FIG. 2 is designed for a 0.6-mm thick optical disc.

Referring to FIG. 3C, when the optical disc 1 has a thickness of 0.60 mm, which is a level of reference with respect to the other thickness levels (hereinafter, referred to as the reference thickness), the intensity distribution of the reflected light beam entering the photodetector 25 is circular due to lack of spherical aberration, and is symmetrical around a center point. When the thickness of the optical disc 1 deviates from the reference thickness of 0.60 mm, spherical aberration occurs as a result of the thickness deviation, and the intensity distribution of the reflected light beam passed through the astigmatism lens 21 and received by the photodetector 25 is asymmetrical about the center point, as illustrated in FIGS. 3A, 3B, 3D, and 3E.

The photodetector 25 detects a variation in thickness of the optical disc 1 from a variation of intensity distribution of the received light. To this end, as shown in FIG. 4, the photodetector 25 of FIG. 2 includes first through fourth inner sections A1, B1, C1, and D1, and first through fourth outer sections A2, B2, C2, and D2 surrounding the first through fourth inner sections A1, B1, C1, and D1.

In a conventional optical pickup having the configuration described above, a thickness variation signal for the optical disc 1 is detected by subtracting a sum of detection signals a2 and c2 of the first and third outer sections A2 and C2 in one diagonal direction of the photodetector 25, and the detection signals b1 and d1 of the second and fourth inner sections B1 and D1, respectively, in the other diagonal direction, from a sum of detection signals a1 and c1 of the first and third inner sections A1 and C1, respectively, in the one diagonal direction, and detection signals b2 and d2 of the second and fourth outer sections B2 and D2, respectively, in the other diagonal direction. In other words, a thickness variation signal St' for the optical disc 1 can be detected from the detection signals a1, b1, c1, and d1 of the first through fourth inner sections A1, B1, C1, and D1, respectively, of the photodetector 25, and the detection signals a2, b2, c2, and d2 of the first through fourth outer sections A2, B2, C2 and D2, respectively, by using the following equation:

$$St' = (a1+c1+b2+d2) - (a2+c2+b1+d1) \quad (3)$$

However, this mechanism of detecting variation of the thickness of the optical disc can be applied to only optical pickups adopting the astigmatism lens. In other words, if an optical pickup does not include the astigmatism lens, a thickness variation of an optical disc used in the optical pickup cannot be detected.

SUMMARY OF THE INVENTION

Various objects and advantages of the invention will be set forth in part in the description that follows and, in part, will be obvious from the description, or may be learned by practice of the invention.

To solve the above problem, it is an object of the present invention to provide an optical pickup detecting variation of the thickness of a recording medium, and/or compensating for spherical aberration caused by the thickness variation of a recording medium, without including an astigmatism lens to cause astigmatism at the light receiving side.

According to an object of the present invention, there is provided an optical pickup including: a light source generating and emitting a light beam; an objective lens focusing the light beam from the light source to form a light spot incident on the recording medium; an optical path changer disposed on an optical path between the light source and the objective lens, altering a traveling path of the incident light beam; a light beam division and detection unit dividing the incident light beam passed through the objective lens and the optical path changer into a first light beam portion and a second light beam portion around the first light beam portion, and detecting first and second detection signals from the first and second light beam portions; and a thickness variation detection circuit detecting a variation in thickness of the recording medium by subtracting the second detection signal from the first detection signal and outputting a thickness variation signal indicative thereof.

The light beam division and detection unit may include a photodetector including first and second light receiving portions dividing the incident light beam into the first light beam portion and the second light beam portion around the first light beam portion and photoelectrically converting the first and second light beam portions into the first and second detection signals, respectively.

Preferably, the light beam division and detection unit includes: a light beam splitter including a first section and a second section, dividing the incident light beam into the first light beam portion and the second light beam portion around the first light beam portion; and first and second photodetectors receiving the first and second light beam portions from the light beam splitter, and photoelectrically converting the first and second light beam portions into the first and second detection signals, respectively.

In another embodiment, the present invention provides for an optical pickup including: a light source generating and emitting a light beam; an objective lens focusing an incident light beam from the light source to form a light spot on the recording medium; an optical path changer disposed on an optical path between the light source and the objective lens, altering a traveling path of the incident light beam; a light beam division and detection unit dividing the incident light beam passed through the objective lens and the optical path changer into a first light beam portion and second and third light beam portions around the first light beam portion, and detecting first, second, and third detection signals from the first, second and third light beam portions, respectively; a thickness variation detection circuit detecting a variation in thickness of the recording medium by subtracting a sum of the second and third detection signals from the first detection signal and outputting a thickness variation signal indicative thereof.

The light beam division and detection unit includes a photodetector including first, second and third light receiving portions dividing the incident light beam into the first, second and third light beam portions, receiving the first, second and third light beam portions, and separately and photoelectrically converting the first, second and third light beam portions, respectively.

The light beam division and detection unit includes: a light beam splitter including first, second, and third sections dividing the incident light beam into the first light beam portion and the second and third light beam portions around the first light beam portion; a first photodetector receiving and photoelectrically converting the first light beam portion into the first detection signal; a second photodetector receiving and photoelectrically converting the second light beam portion into the second detection signal; and a third photodetector receiving and photoelectrically converting the third light beam portion into the second detection signal.

The optical pickup according to the present invention may further include a spherical aberration compensation element on the optical path between the optical path changer and the objective lens, driven according to the thickness variation signal from the thickness variation detection circuit to compensate for spherical aberration caused by the thickness variation of the recording medium.

The optical pickup according to the present invention may further include: a collimating lens on the optical path between the light source and the optical path changer, collimating a diverging light beam from the light source; and an actuator actuating the collimating lens according to the thickness variation signal detected by the thickness variation detection circuit, compensating for spherical aberration caused by the thickness variation of the recording medium.

It is another object of the present invention to provide for an optical pickup for a recording medium, including: a light beam division and detection unit including receiving portions dividing an incident light beam reflected on the recording medium into a first light beam portion and a second light beam portion around the first light beam portion and converting the first and second light beam portions into first and second detection signals, respectively; and a thickness variation detection circuit detecting a variation in thickness of the recording medium according to the first and second detection signals and outputting a thickness variation signal indicative thereof.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
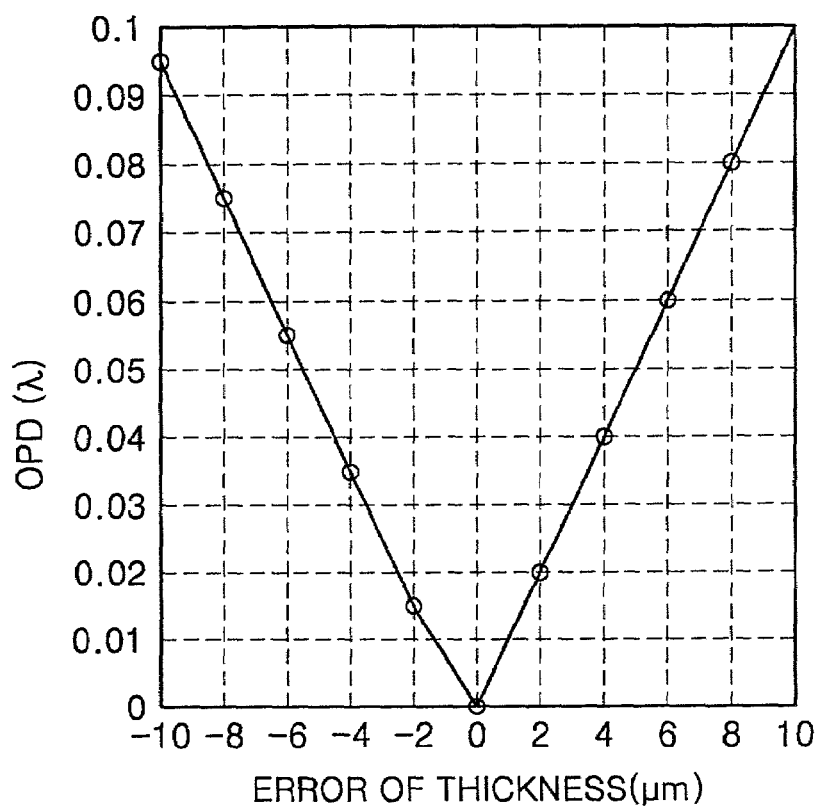
FIG. 1 is a graph showing the relation between thickness deviation of a recording medium and wavefront aberration (optical path difference (OPD)) caused by the thickness deviation.
Figure 2:
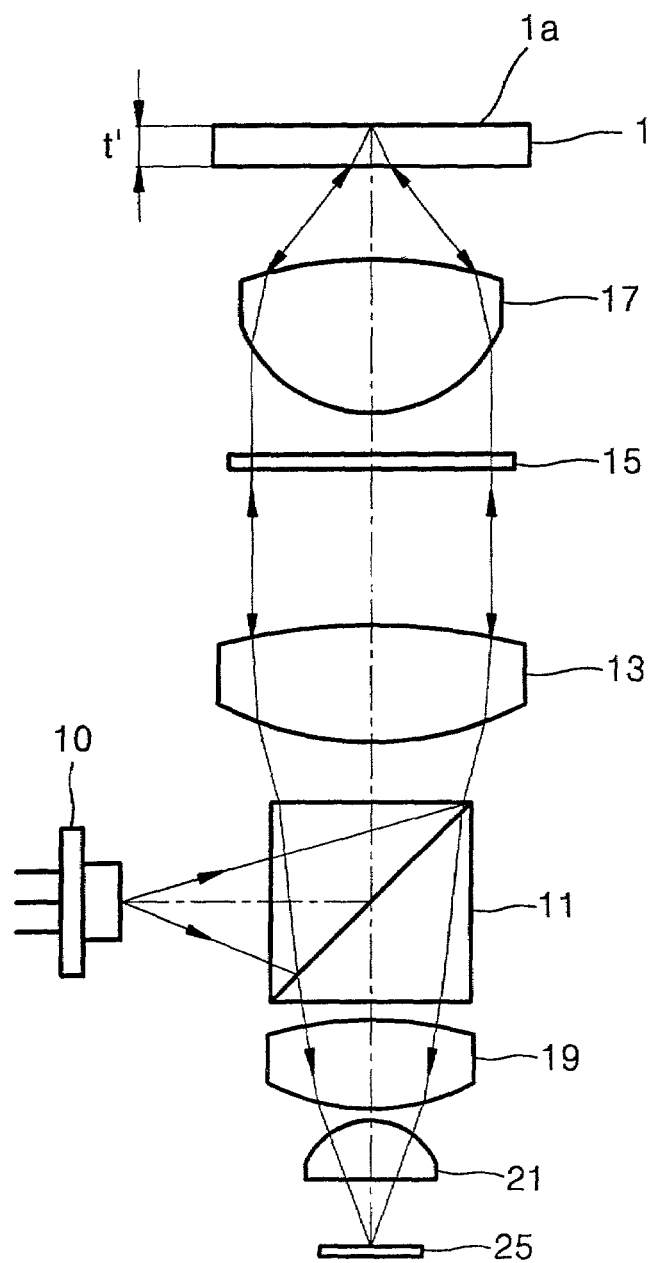
FIG. 2 illustrates a conventional optical pickup detecting thickness variation of an optical disc.
Figure 3A:
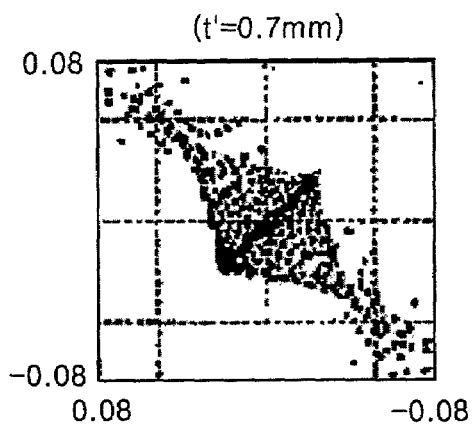
FIG. 3A illustrates a distribution of light entering a photodetector of the optical pickup of FIG. 2, which is designed for 0.60-mm thick optical discs and the optical disc has a thickness of 0.70 mm.
Figure 3B:
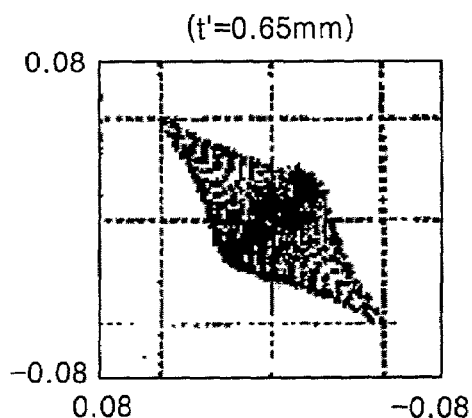
FIG. 3B illustrates a distribution of light entering the photodetector of the optical pickup of FIG. 2, which is designed for 0.60-mm thick optical discs and the optical disc has a thickness of 0.65 mm.
Figure 3C:
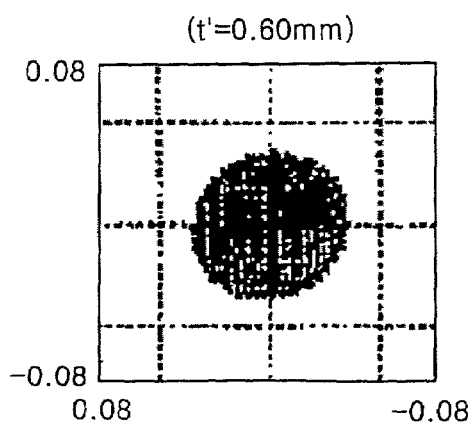
FIG. 3C illustrates a distribution of light entering the photodetector of the optical pickup of FIG. 2, which is designed for 0.60-mm thick optical discs and the optical disc has a thickness of 0.60 mm.
Figure 3D:
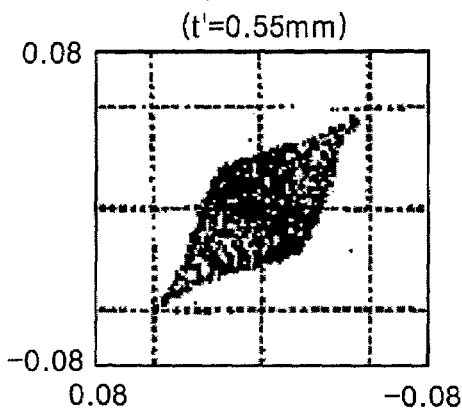
FIG. 3D illustrates a distribution of light entering the photodetector of the optical pickup of FIG. 2, which is designed for 0.60-mm thick optical discs and the optical disc has a thickness of 0.55 mm.
Figure 3E:
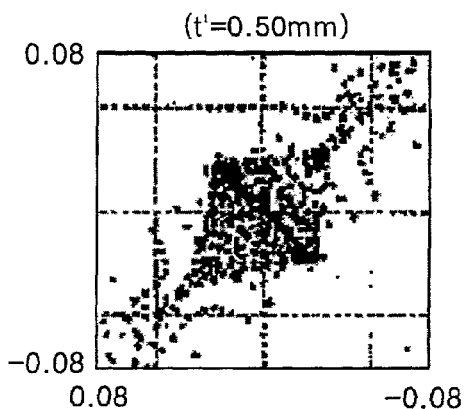
FIG. 3E illustrates a distribution of light entering the photodetector of the optical pickup of FIG. 2, which is designed for 0.60-mm thick optical discs and the optical disc has a thickness of 0.50 mm.
Figure 4:
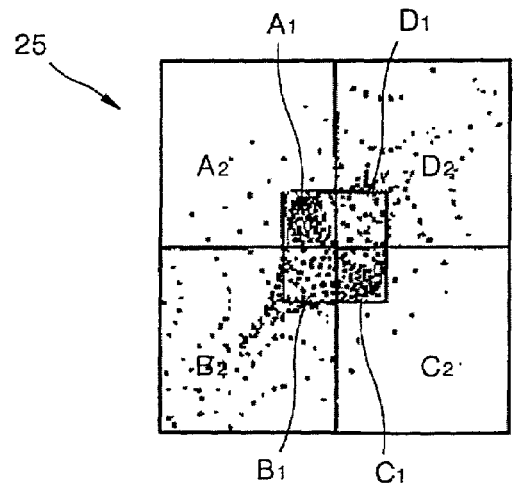
FIG. 4 is a plan view illustrating a configuration of the photodetector shown in FIG. 2.
Figure 5:
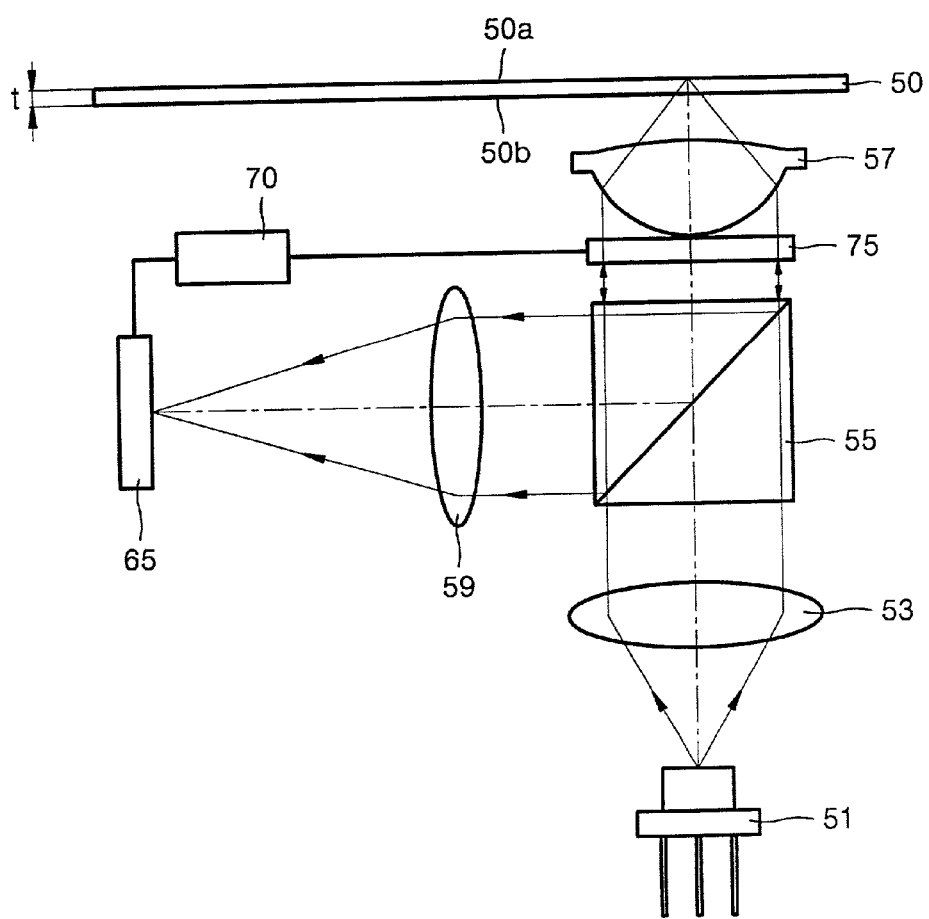
FIG. 5 shows an exemplary embodiment of an optical pickup in accordance with the present invention.

An exemplary embodiment of an optical pickup according to the present invention is illustrated in FIG. 5. The optical pickup includes a light source 51 generating and emitting a light beam, and an objective lens 57 focusing an incident light beam LB from the light source 51 to form a light spot on an information recording surface 50a of a recording medium 50. An optical path changer is disposed on the optical path between the light source 51 and the objective lens 57, for altering the traveling path of the incident light beam LB. A photodetector 65 is provided to divide and detect the light beam passed back through the objective lens 57 and the optical path changer after being reflected from the recording medium 50, and a thickness variation detection circuit 70 is provided to detect variation of the thickness of the recording medium 50 from a plurality of detection signals output from the photodetector 65. Here, the thickness t of the recording medium 50 is defined as a distance between a light incident surface 50b of the recording medium 50 and the information recording surface 50a. Thickness variation refers to both thickness deviation according to position on one recording medium and a difference in thickness between different optical discs.

The light source 51 may be a semiconductor laser, such as an edge emitting laser or a vertical cavity surface emitting laser (VCSEL). As the optical path changer, a beam splitter 55 for transmitting and reflecting an incident light beam LB by a predetermined ratio may be adopted. Alternatively, the optical path changer may include both, a polarization beam splitter (not shown) for selectively transmitting or reflecting an incident light beam LB according to a polarization of the incident light beam LB, and a quarter-wave plate (not shown) disposed on the optical path between the polarization beam splitter and the objective lens 57, for changing the phase of an incident light beam LB.

In the optical pickup of FIG. 5 for recording and reproduction with a next generation digital versatile disc (DVD), so-called "high-definition (HD)-DVD" family recording medium, a blue-light semiconductor laser may be adopted as the light source 51 to emit a light beam having a wavelength of about 400–420 nm, for instance, a wavelength of about 405 nm, and a lens having a numerical aperture (NA) of 0.7 or more, such as, an NA of 0.85, may be adopted as the objective lens 57.

The optical pickup according to the present invention may further include a collimating lens 53 on the optical path between the light source 51 and the beam splitter 55, for collimating a diverging light beam emitted from the light source 51. The optical pickup further includes a sensing lens 59 on the optical path between the beam splitter 55 and the photodetector 65, for condensing an incident light beam LB. The distance between the sensing lens 59 and the photodetector 65 is determined such that the light spot received by the photodetector 65 has an appropriate size, for example, a diameter of about 100 µm.

The photodetector 65 as a light beam division and detection unit, is constructed such that the photodetector 65 divides and detects the light beam passed back through the objective lens 57 and the optical path changer after being reflected on the recording medium 50, taking into account a variation in the intensity distribution of the light beam according to thickness variation of the recording medium 50.

For illustrative purposes, the objective lens 57 has an NA of 0.85, the optical pickup is designed for the recording medium 50 having a thickness of 0.1 mm, and the light source 51 emits a 400-nm light beam. In this case, FIGS. 6A through 6C and FIGS. 7A through 7C illustrate intensity distribution and phase distribution of the light beam passed back through the objective lens 57 and the optical path changer after being reflected from the recording medium 50, with respect to the variation in the thickness of the recording medium 50.

Figure 6A:
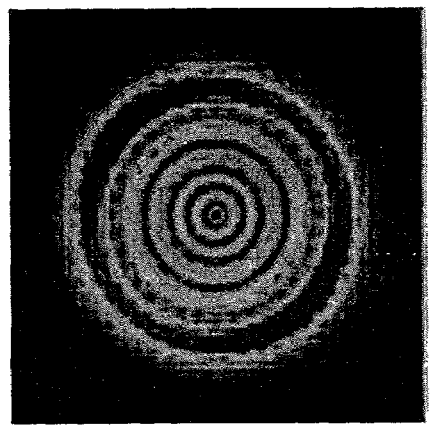
FIG. 6A illustrates an intensity distribution of a light beam passed back through an objective lens and an optical path changer of the optical pickup of FIG. 5 after being reflected from the recording medium, which is 10 μm thinner than a reference thickness for which the optical pickup is designed.
Figure 6B:
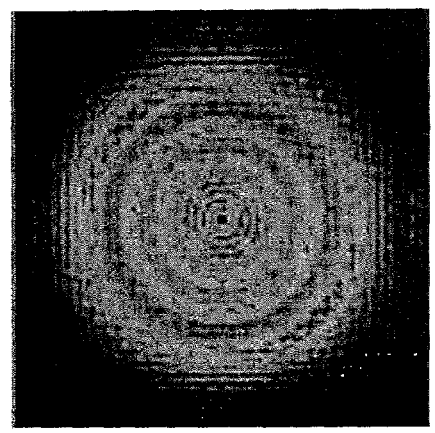
FIG. 6B illustrates an intensity distribution of the light beam passed back through the objective lens and the optical path changer of the optical pickup of FIG. 5 after being reflected from the recording medium having a reference thickness of 0.1 mm.
Figure 6C:
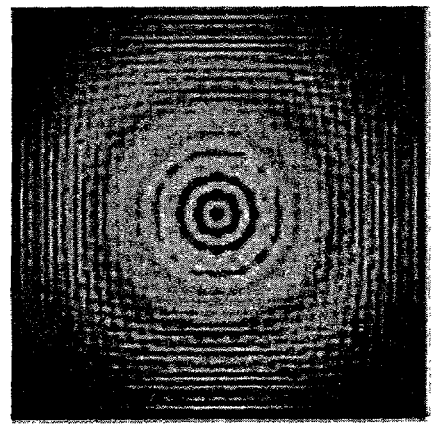
FIG. 6C illustrates an intensity distribution of the light beam passed back through the objective lens and the optical path changer of the optical pickup of FIG. 5 after being reflected from the recording medium, which is 10 μm thicker than the reference thickness for which the optical pickup is designed.
Figure 7A:
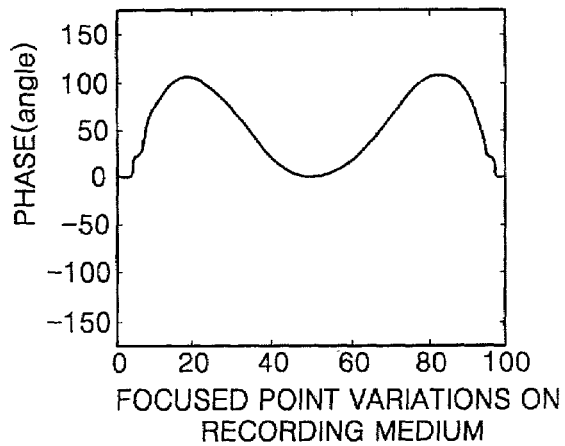
FIG. 7A illustrates a phase distribution of the light beam of FIG. 6A.
Figure 7B:
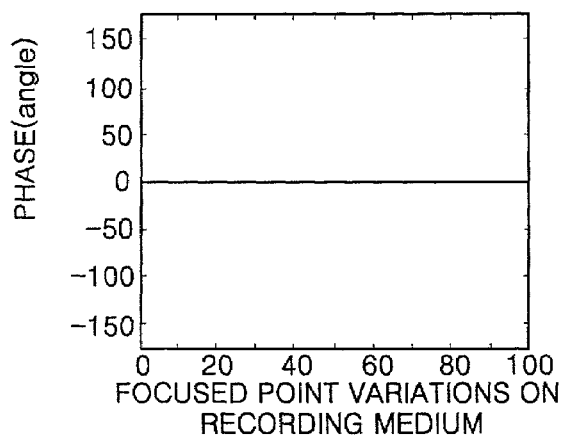
FIG. 7B illustrates a phase distribution of the light beam of FIG. 6B.
Figure 7C:
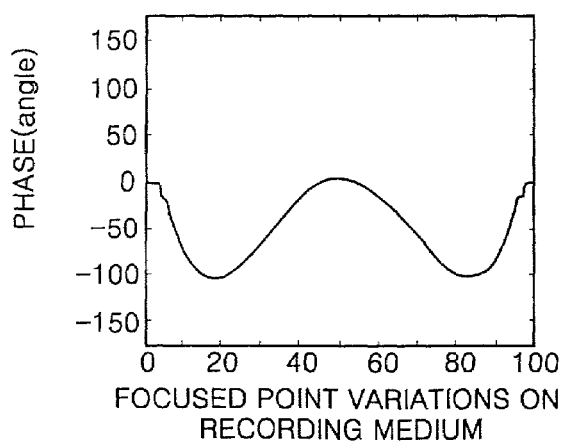
FIG. 7C illustrates a phase distribution of the light beam of FIG. 6C.

In particular, FIG. 6A illustrates the intensity distribution of the light passed through the optical path changer after being reflected on the recording medium 50 which is 10 µm thinner than the 0.1 mm thickness for which the optical pickup is designed (hereinafter referred to as the reference thickness). FIG. 7A illustrates the phase distribution of the light beam of FIG. 6A. FIG. 6B illustrates the intensity distribution of the light beam for the recording medium 50 having a thickness equal to the reference thickness of 0.1 mm. FIG. 7B shows the phase distribution of the light beam of FIG. 6B. FIG. 6C illustrates the intensity distribution of the light beam for the recording medium 50, which is 10 µm thicker than the reference thickness. FIG. 7C illustrates the phase distribution of the light beam of FIG. 6C.

Referring to FIGS. 6A and 7A, when a portion of the recording medium 50, onto which the light beam is focused, is thinner than the reference thickness, the intensity distribution of the light beam is weaker at a central axis, and increases with increased distance from the central axis. Also, the phase distribution of the light beam appears like twin peaks, that is, symmetrical with respect to the central axis. Referring to FIGS. 6B and 7B, when a portion of the recording medium 50 onto which the light beam is focused is equal to the reference thickness, the intensity distribution of the light beam is uniform and the phase distribution is uniform. Referring to FIGS. 6C and 7C, when a portion of the recording medium 50 onto which the light beam is focused is thicker than the reference thickness, the intensity distribution and the phase distribution of the light beam are inverted with respect to those of FIGS. 6A and 7A.

As illustrated in FIGS. 6A through 6C and FIGS. 7A through 7C, the intensity distribution and the phase distribution of the light beam according to the thickness variations of the recording medium 50 vary symmetrically around the central axis and are opposite with respect to an inverse in thickness variations. Furthermore, variations in the intensity distribution and phase spectrum of the light beam caused by an increase in the thickness of the recording medium above the reference thickness are opposite to variation in the intensity distribution and the phase spectrum of the light beam caused by a decrease in the thickness of the recording medium below the reference thickness.

Figure 8:
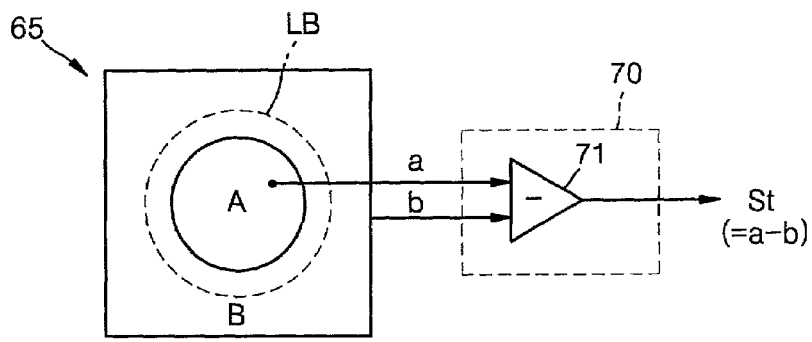
FIG. 8 illustrates exemplary embodiment of a photodetector of FIG. 5 and a thickness variation detection circuit.

For this reason, the photodetector 65 may be constructed such that the photodetector 65 separately divides the incident light beam LB into a first light portion corresponding to the optical axis and a second light portion around the periphery of the optical axis. For example, as shown in FIG. 8, the photodetector 65 may include first and second light receiving portions A and B, respectively, for dividing the incident light beam LB into a first light beam portion corresponding to the central optical axis, and a second light beam portion around the first light beam portion, and for photoelectrically converting the first and second light beam portions into first and second detection signals a and b, respectively. In this case, the first light receiving portion A of the photodetector 65 may have a circular or rectangular form to allow division of the incident light beam LB into the first light beam portion, corresponding to the central optical axis, and the second light beam portion around the first light beam portion, and to allow separate detection of the two portions.

Figure 9:
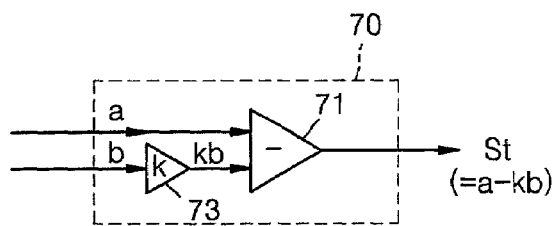
FIG. 9 illustrates an alternative embodiment of the thickness variation detection circuit of FIG. 8.

When the photodetector 65 includes the first and second light receiving portions A and B, as shown in FIG. 8, the thickness variation detection circuit 70 is constructed with a subtractor 71 for subtracting the second detection signal b corresponding to the second light beam portion of the second light receiving portion B from the first detection signal a corresponding to the first light beam portion of the first light receiving portion A and outputting a result of the subtraction as a thickness variation signal St to the recording medium 50. In this case, as shown in FIG. 9, the thickness variation detection circuit 70 may further include a gain controller 73 for amplifying at least one of the first and second detection signals a and b by a predetermined gain factor k prior to the subtraction by the subtractor 71, such that an offset of the thickness variation signal St can be adjusted.

Figure 10:
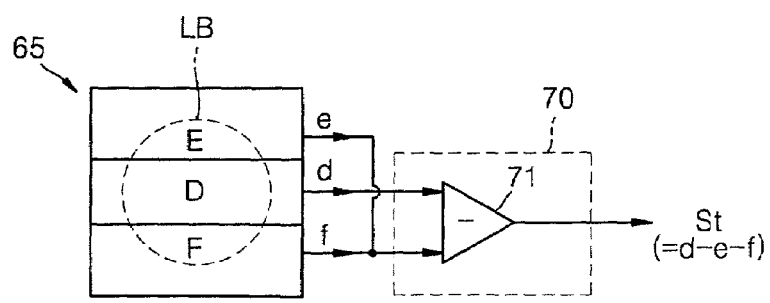
FIG. 10 illustrates alternative embodiment of the photodetector and the thickness variation detection circuit of FIG. 5.

Alternatively, as shown in FIG. 10, the photodetector 65 may include first, second, and third light receiving portions D, E, and F, respectively, for dividing the incident light beam LB into a first light beam portion aligned with an optical axis, and second and third light beam portions around the first light beam portion, and for photoelectrically converting the first, second, and third light beam portions into first, second, and third detection signals d, e, and f, respectively. The first, second, and third light receiving portions D, E, and F may be arranged in a direction corresponding to either a tangential or radial direction of the recording medium 50.

When the photodetector 65 is constructed as illustrated in FIG. 10, the thickness variation detection circuit 70 detects the variation in the thickness of the recording medium 50 by subtracting the sum of the second and third detection signals e and f, of the second and third light receiving portions E and F, from the first detection signal d of the first light receiving portion D. As illustrated in FIG. 9, the thickness variation detection circuit 70 may be constructed such that the thickness variation detection circuit 70 may amplify at least one of the first, second and third detection signals d, e, and f, respectively, by a predetermined gain factor k, and process the first, second, and third detection signals d, e, and f, respectively, so that the offset of the thickness variation signal St may be adjusted.

For the photodetector 65 illustrated in FIGS. 8 and 10, a size of the first light receiving portion A of FIG. 8 and a size of the first light receiving portion D of FIG. 10 are determined such that the first light receiving portion A and the first light receiving portion D receive 10–90% of the entire incident light beam LB.

Turning back to FIG. 5, the optical pickup according to the present invention may further include a spherical aberration compensation element 75 on the optical path between the optical path changer and the objective lens 57, which is driven according to the thickness variation signal St produced by the thickness variation detection circuit 70, thereby compensating for spherical aberration caused by thickness variation of the recording medium 50.

The spherical aberration compensation element 75 may be a liquid crystal plate manufactured by injecting liquid crystals between two sheets of transparent substrates having electrode patterns. Due to the anisotropic property of the liquid crystal with respect to a refractive index, the phase of the light beam passing through the liquid crystal plate changes. In particular, the liquid crystal plate is driven according to the thickness variation signal St such that a shape of a wavefront of the light beam passing the liquid crystal plate is changed into an inverse shape of spherical aberration caused by the thickness variation of the recording medium 50, thereby compensating for the spherical aberration caused by the thickness variation of the recording medium 50. In this case, a driving circuit for driving the spherical aberration compensation element 75 may be included in or separate from the thickness variation detection circuit 70.

Figure 11:
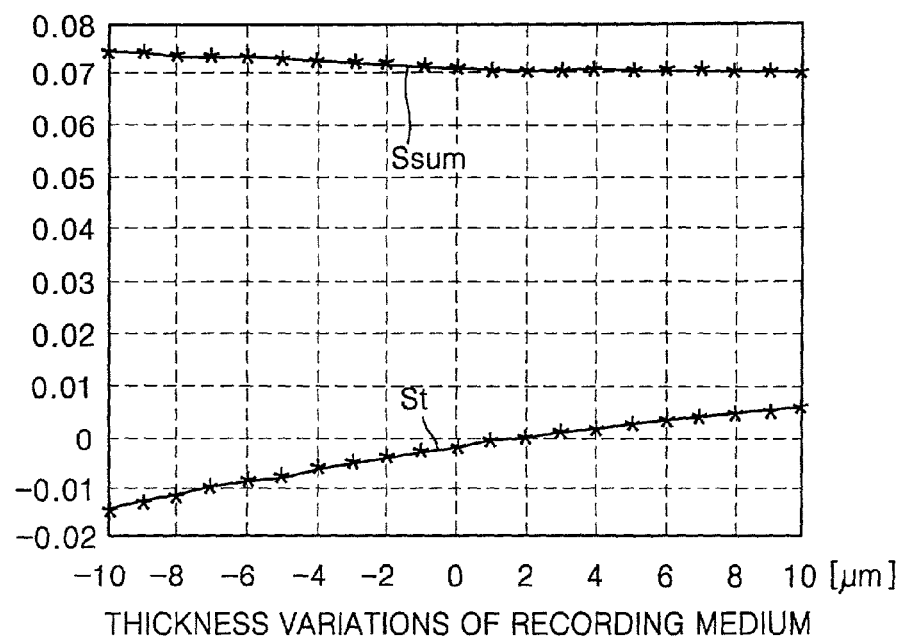
FIG. 11 is a graph of a thickness variation signal and a sum of first and second detection signals of first and second light receiving portions of the photodetector when the photodetector of the optical pickup, according to the present invention, has the embodiment of FIG. 8.
Figure 12:
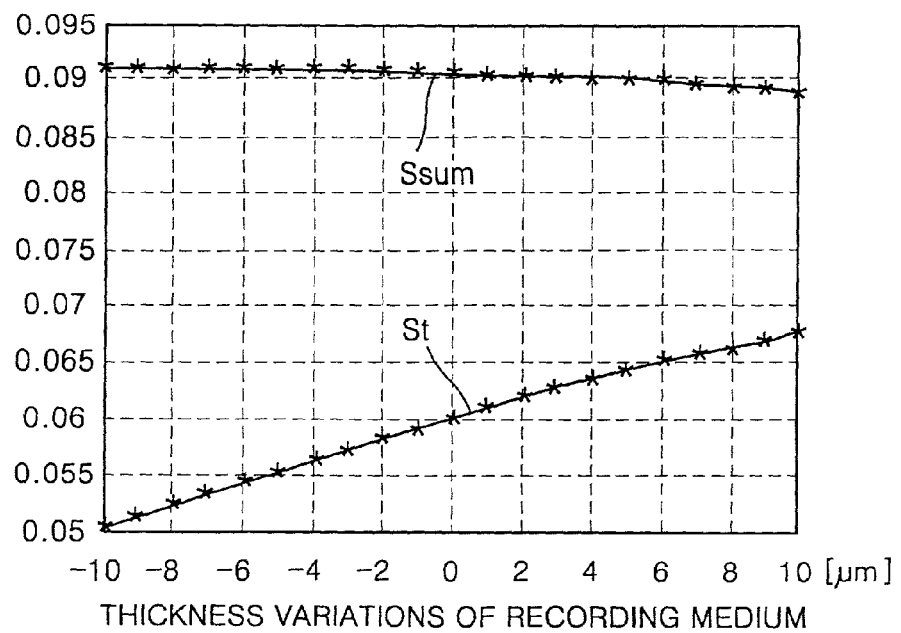
FIG. 12 is a graph of a thickness variation signal for the recording medium and a sum of the first, second, and third detection signals of first, second and third light receiving portions of the photodetector when the photodetector of the optical pickup, according to the present invention, has the embodiment of FIG. 10.

FIG. 11 is a graph of the thickness variation signal St and a sum Ssum of the first and second detection signals a and b of the first and second light receiving portions A and B of the photodetector 65 versus the thickness variation of the recording medium 50 when the photodetector 65 of the optical pickup of the present invention has the embodiment of FIG. 8. FIG. 12 is a graph of the thickness variation signal St and the sum Ssum of the first, second, and third detection signals d, e, and f of the first, second, and third light receiving portions D, E, and F of the photodetector 65 versus the thickness variation of the recording medium 50, when the photodetector 65 of the optical pickup of the present invention has the embodiment of FIG. 10. As shown in FIGS. 11 and 12, the variation of the thickness variation signal St detected by the thickness variation detection circuit 70 with respect to the thickness variation of the recording medium 50 is relatively larger than the variation of the sum Ssum of the detection signals detected by the photodetector 65.

As described with reference to FIGS. 11 and 12, the variation in the thickness of the recording medium 50 can be detected by the optical pickup of the present invention. Thus, the spherical aberration caused by the thickness variation of the recording medium 50 can be corrected by driving the spherical aberration compensation element 75 according to the thickness variation signal St.

Figure 13:
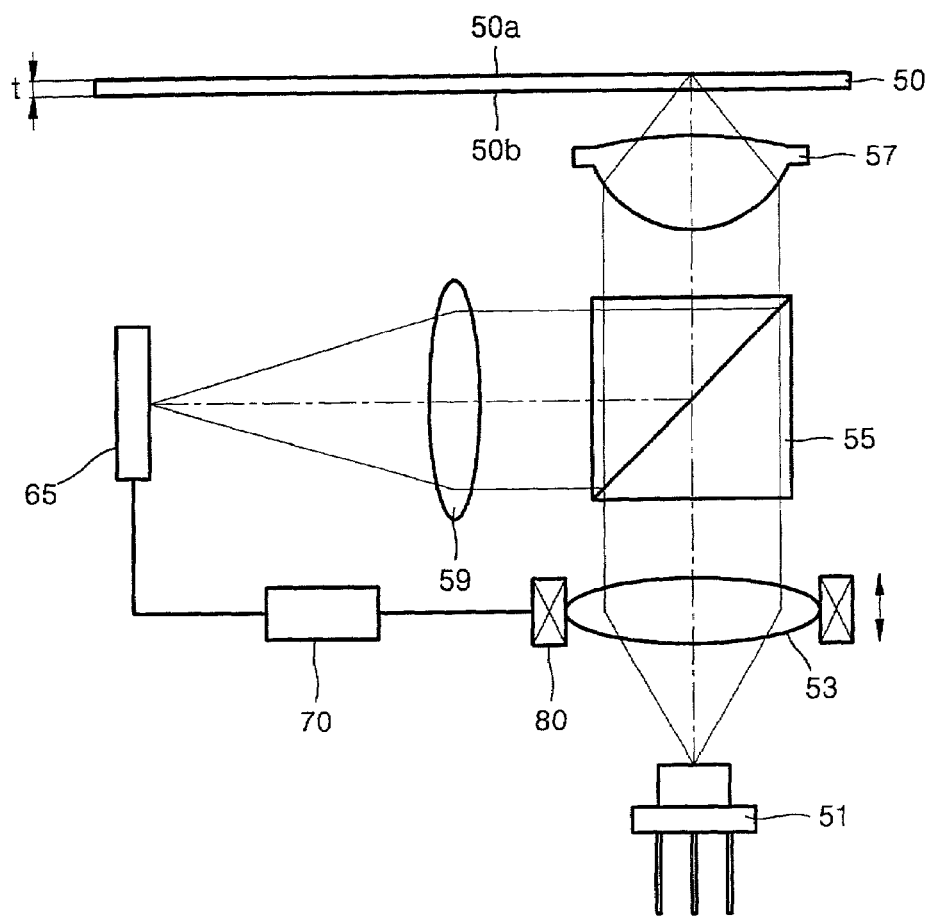
FIG. 13 illustrates an alternative embodiment of the optical pickup according to the present invention.

Referring to FIG. 13, for the purpose of compensating for spherical aberration caused by the thickness variation of the recording medium 50, the optical pickup according to the present invention may include an actuator 80 actuating the collimating lens 53 along the optical axis according to the thickness variation signal St produced by the thickness variation detection circuit 70 instead of the spherical aberration correction element 75 of FIG. 5.

Figure 14:
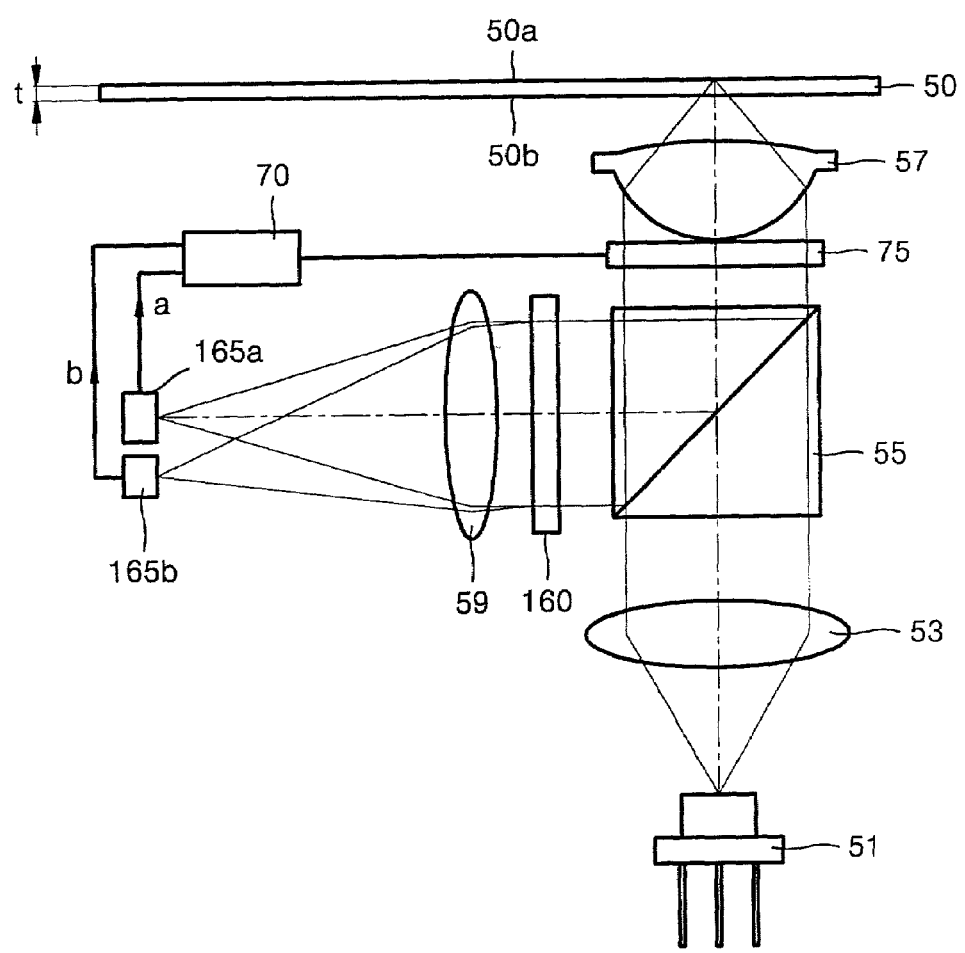
FIG. 14 illustrates an alternative embodiment of the optical pickup according to the present invention.

FIG. 14 illustrates an alternative embodiment of the optical pickup according to the present invention. In the present embodiment, rather than the photodetector 65 having the embodiment shown in FIG. 8, a light beam splitter 160, and first and second photodetectors 165a and 165b are used as a light beam division and detection unit. In FIG. 14, the same elements as in FIG. 5 are denoted by the same reference numerals, and descriptions thereof will not be provided here.

Figure 15:
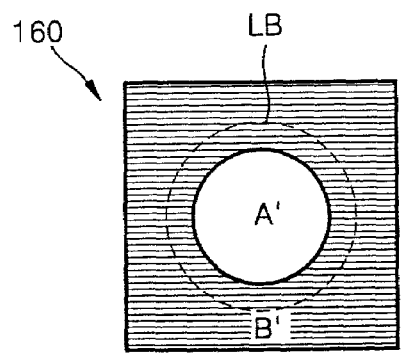
FIG. 15 is a plan view showing an embodiment of a light beam splitter of FIG. 14.

The light beam splitter 160 includes first and second sections A' and B' as shown in FIG. 15 for dividing the incident light beam LB into a first light beam portion on the optical axis, and a second light beam portion around the first light beam portion. The first section A' directly transmits, for example, the first light beam portion of the incident light beam LB, or diffracts the first light beam portion of the incident light beam LB into a 0th-order beam, so that the transmitted or diffracted light beam is received by the first photodetector 165a. The second section B' diffracts, for example, the second light beam portion of the incident light beam LB so that a $+1^{st}$-order or $-1^{st}$-order beam is received by the second photodetector 165b. The light beam splitter 160 may be a hologram optical element (HOE), which has in the first section A' a through hole, a direct transmit portion, or a hologram pattern for diffracting the incident light beam LB and transmitting a resulting $0^{th}$-order light beam, and has in the second section B' a hologram pattern for diffracting the incident light beam LB and transmitting a resulting $+1^{st}$-order or $-1^{st}$-order light beam.

In the optical pickup according to the embodiment of the present invention shown in FIG. 14, the principle of detecting the thickness variation signal St for the recording medium 50 from the first and second detection signals a and b of the first and second photodetectors 165a and 165b, and correcting the spherical aberration caused by the thickness variation of the recording medium 50 by driving the spherical aberration compensation element 75 according to the thickness variation signal St, is the same as in the previous embodiments. Alternatively, the optical pickup of FIG. 14 may include the actuator 80 for actuating the collimating lens 53 along the optical axis, as shown in FIG. 13, thereby compensating for spherical aberration caused by thickness variation of the recording medium 50.

Figure 16:
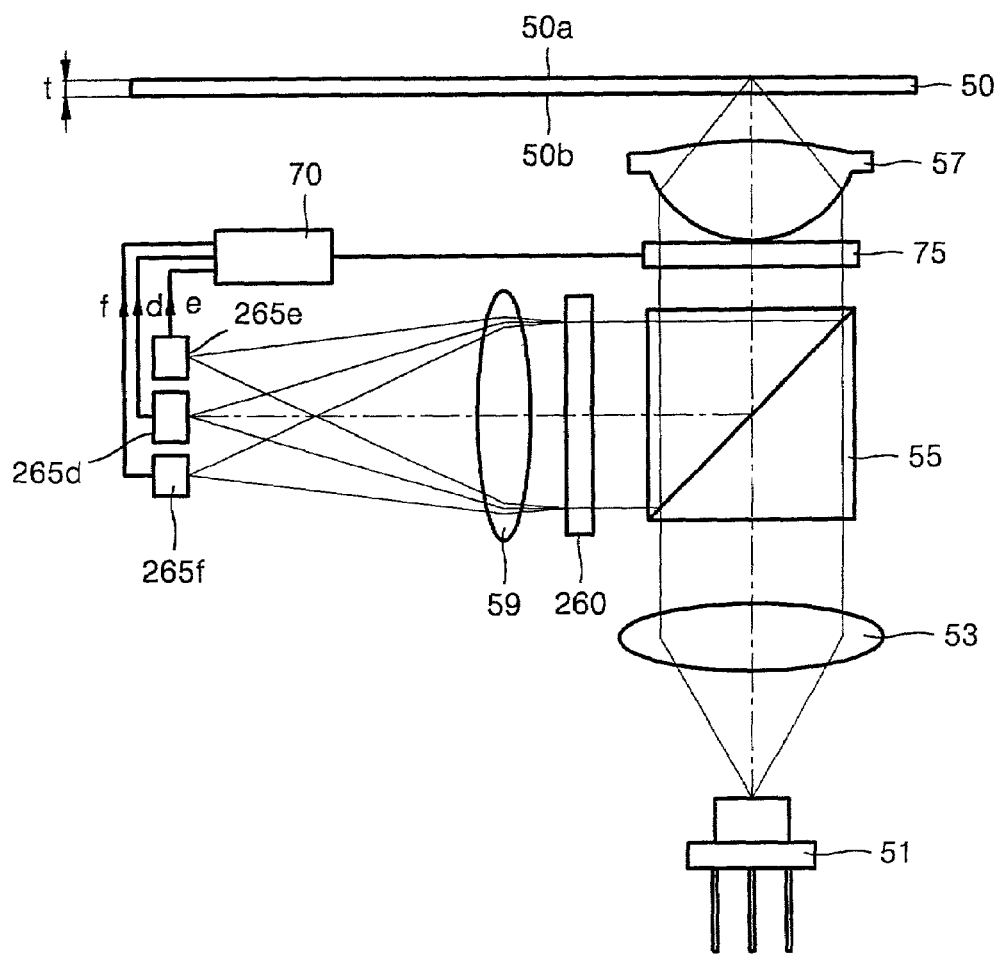
FIG. 16 illustrates an alternative embodiment of the optical pickup according to the present invention.

FIG. 16 illustrates an alternative embodiment of the optical pickup according to the present invention. In the present embodiment, instead of the photodetector 65 having the divided configuration shown in FIG. 10, a light beam splitter 260, and first, second and third photodetectors 265d, 265e, and 265f are used as a light beam division and detection units.

In FIG. 16, the same elements as in FIG. 5 are denoted by the same reference numerals, and descriptions thereof will not be provided here.

Figure 17:
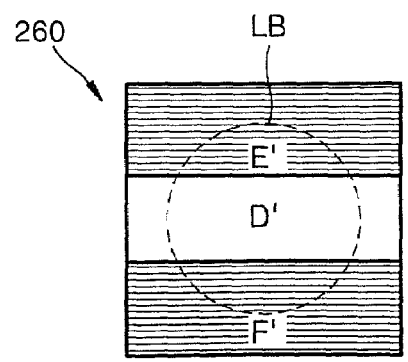
FIG. 17 is a plan view showing an embodiment of the light beam splitter of FIG. 16.

In the embodiment shown in FIG. 16, the light beam splitter 260 includes first, second and third sections D', E' and F', as shown in FIG. 17, for dividing the incident light beam LB into a first light beam portion on the optical axis, and second and third light beam portions around the first light beam portion, based on a principle similar to the light beam splitter 160 of FIG. 15. The first section D' directly transmits, for example, the first light beam portion of the incident light beam LB, or diffracts the first light beam portion of the incident light beam LB and transmits the resulting $0^{th}$-order beam, so that the transmitted or diffracted light beam is received by the first photodetector 265d. The second section E' diffracts, for example, the second light beam portion of the incident light beam LB so that the $+1^{st}$-order or $-1^{st}$-order diffracted light beam is received by the second photodetector 265e. The third section F' diffracts, for example, the third light beam portion of the incident light beam LB so that the $-1^{st}$-order or $+1^{st}$-order diffracted light beam is received by the third photodetector 265f. The light beam splitter 160 may be an HOE, which has in the first section D' a through hole, a direct transmit portion, or a hologram pattern for diffracting the incident light beam LB, and has in both, the second and third sections E' and F', a hologram pattern for diffracting the incident light beam LB.

In the optical pickup according to the embodiment of the present invention shown in FIG. 16, the principle of detecting the thickness variation signal St for the recording medium 50 from the first, second, and third detection signals d, e, and f of the first, second, and third photodetectors 265d, 265e, and 265f, and compensating for the spherical aberration caused by thickness variation of the recording medium 50 is the same as the principle described in the previous embodiments. In particular, the principle of detecting the thickness variation signal St for the recording medium 50 used by the embodiment of FIG. 16 includes driving the spherical aberration compensation element 75 or the collimating lens 53 according to the detected thickness variation signal St.

As described above, in the optical pickups according to the present invention, a single photodetector having a divided configuration or a light beam splitter and a plurality of photodetectors is used as a light beam division and detection unit. The light beam passed through an objective lens and an optical path changer after having been reflected from a recording medium is divided and detected by the light beam division and detection unit, taking into account a variation in intensity distribution of the light caused by thickness variation of the recording medium. A thickness variation signal is detected by processing the detection signals from the photodetector. Thus, the variation in thickness of the recording medium can be detected with the optical system without an astigmatism lens installed to cause astigmatism at the light receiving side of the optical pickup. Spherical aberration caused by the thickness variation of the recording medium can be corrected by driving a spherical aberration compensation element or a collimating lens along the optical axis according to the detected thickness variation signal.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical pickup for a recording medium, comprising:
   a light source generating and emitting a light beam;
   an objective lens focusing the light beam from the light source to form a light spot on the recording medium;
   an optical path changer disposed on an optical path between the light source and the objective lens, altering a traveling path of the light beam incident on the recording medium;
   a light beam division and detection unit dividing the incident light beam passed through the objective lens and the optical path changer after being reflected from the recording medium into a first light beam portion and a second light beam portion encircling the first light beam portion, and detecting first and second detection signals from the first and second light beam portions; and
   a thickness variation detection circuit detecting a variation in thickness of the recording medium by subtracting the second detection signal from the first detection signal and outputting a thickness variation signal indicative thereof.

2. The optical pickup as recited in claim 1, wherein the light beam division and detection unit comprises:
   a photodetector comprising first and second light receiving portions dividing the incident light beam into the first light beam portion and the second light beam portion encircling the first light beam portion and photoelectrically converting the first and second light beam portions into the first and second detection signals, respectively.

3. The optical pickup as recited in claim 1, wherein the light beam division and detection unit divides and detects the light beam as a circular or rectangular first light beam portion and as a circular or rectangular second light beam portion surrounding the first light beam portion.

4. The optical pickup as recited in claim 3, wherein the first light beam portion corresponds to 10–90% of the incident light beam.

5. The optical pickup as recited in claim 1, further comprising:
   a spherical aberration compensation element on the optical path between the optical path changer and the objective lens, driven according to the thickness variation signal from the thickness variation detection circuit to compensate for spherical aberration caused by the thickness variation of the recording medium.

6. The optical pickup as recited in claim 1, wherein the thickness of the recording medium is a distance between a light incident surface of the recording medium and an information recording surface of the recording medium.

7. The optical pickup as recited in claim 2, wherein the optical path changer comprises:
   a beam splitter transmitting the light beam from the light source to the recording medium through the objective lens and reflecting the incident light beam through the objective lens to the photodetector by a predetermined ratio.

8. The optical pickup as recited in claim 1, further comprising:
   a collimating lens on the optical path between the light source and the optical path changer collimating the light beam, which is diverging, from the light source; and
   a sensing lens on the optical path between the optical path changer and the light beam division and detection unit condensing the incident light beam.

9. The optical pickup as recited in claim 1, wherein the optical path changer comprises:
   a polarization beam splitter selectively transmitting the light beam from the light source to the recording medium and reflecting the incident light beam to the photodetector according to a polarization of the incident light beam; and
   a quarter-wave plate disposed on the optical path between the polarization beam splitter and the objective lens changing a phase of the incident light beam.

10. The optical pickup as recited in claim 1, further comprising:

a blue-light semiconductor laser emitting the light beam having a wavelength between 400 nm and 420 nm, wherein the objective lens comprises a numerical aperture of at least 0.7.

11. The optical pickup as recited in claim 2, wherein a size of the light receiving portion is determined where the first light receiving portion receives 10–90% of the entire incident light beam.

12. An optical pickup for a recording medium, comprising:
a light beam division and detection unit comprising receiving portions dividing an incident light beam reflected from the recording medium into a first light beam portion and a second light beam portion encircling the first light beam portion and converting the first and second light beam portions into first and second detection signals, respectively; and
a thickness variation detection circuit detecting a variation in thickness of the recording medium according to the first and second detection signals and outputting a thickness variation signal indicative thereof.

13. The optical pickup according to claim 12, wherein the thickness variation detection circuit detects the variation in thickness of the recording medium by subtracting the second detection signal from the first detection signal and outputs a thickness variation signal indicative thereof.

14. The optical pickup according to claim 12, further comprising:
a light source generating and emitting a light beam;
an objective lens focusing the light beam from the light source to form a light spot incident on the recording medium; and
an optical path changer disposed on an optical path between the light source and the objective lens, altering a traveling path of the incident light beam.

15. The optical pickup as recited in claim 12, further comprising:
a spherical aberration compensation element on the optical path between the optical path changer and the objective lens, driven according to the thickness variation signal from the thickness variation detection circuit to compensate for spherical aberration caused by the thickness variation of the recording medium.

16. The optical pickup as recited in claim 14, wherein the thickness of the recording medium is a distance between a light incident surface of the recording medium and an information recording surface of the recording medium.

17. The optical pickup as recited in claim 14, wherein the optical path changer comprises:
a beam splitter transmitting the light beam from the light source to the recording medium through the objective lens and reflecting the incident light beam through the objective lens to the photodetector by a predetermined ratio.

18. The optical pickup as recited in claim 14, further comprising:
a collimating lens on the optical path between the light source and the optical path changer collimating a diverging light beam from the light source; and
a sensing lens on the optical path between the optical path changer and the light beam division and detection unit condensing the incident light beam.

19. The optical pickup as recited in claim 14, wherein the optical path changer comprises:
a polarization beam splitter selectively transmitting the light beam from the light source to the recording medium and reflecting the incident light beam to the photodetector according to a polarization of the incident light beam; and
a quarter-wave plate disposed on the optical path between the polarization beam splitter and the objective lens changing a phase of the incident light beam.

20. The optical pickup as recited in claim 14, wherein the light beam division and detection unit comprises:
a light beam splitter comprising a first section and a second section dividing the incident light beam into the first light beam portion and the second light beam portion around the first light beam portion; and
a photodetector receiving and photoelectrically converting the first and second light beam portions into the first and second detection signals, respectively.

21. The optical pickup as recited in claim 14, further comprising:
a blue-light semiconductor laser emitting the light beam having a wavelength between 400 nm and 420 nm, wherein the objective lens comprises a numerical aperture of at least 0.7.

22. An optical pickup for a recording medium, comprising:
a light source generating and emitting a light beam;
an objective lens focusing the light beam from the light source to form a light spot on the recording medium;
an optical path changer disposed on an optical path between the light source and the objective lens, altering a traveling path of the light beam incident on the recording medium;
a light beam division and detection unit dividing the incident light beam passed through the objective lens and the optical path changer after being reflected from the recording medium into a first light beam portion and a second light beam portion encircling the first light beam portion, and detecting first and second detection signals from the first and second light beam portions; and
a thickness variation detection circuit detecting a variation in thickness of the recording medium by subtracting the second detection signal from the first detection signal and outputting a thickness variation signal indicative thereof to compensate for spherical aberration, wherein the optical pickup is exclusive of an astigmatism lens causing astigmatism affecting the light beam passed back through the objective lens, and the optical path changer after being reflected from the recording surface of the optical disc.

23. An optical pickup for a recording medium, comprising:
a light source generating and emitting a light beam;
an objective lens focusing the light beam from the light source to form a light spot on the recording medium;
an optical path changer disposed on an optical path between the light source and the objective lens, altering a traveling path of the light beam incident on the recording medium;
a light beam division and detection unit dividing the incident light beam passed through the objective lens and the optical path changer after being reflected from the recording medium into a first light beam portion and a second light beam portion around the first light beam portion, and detecting first and second detection signals from the first and second light beam portions;
a thickness variation detection circuit detecting a variation in thickness of the recording medium by subtracting the second detection signal from the first detection signal and outputting a thickness variation signal indicative thereof; and a spherical aberration compensation element on the optical path between the optical path changer and the objective lens, driven according to the thickness variation signal from the thickness variation detection circuit to compensate for spherical aberration caused by the thickness variation of the recording medium.

24. An optical pickup for a recording medium, comprising:

a light beam division and detection unit comprising receiving portions dividing an incident light beam reflected from the recording medium into a first light beam portion and a second light beam portion around the first light beam portion and converting the first and second light beam portions into first and second detection signals, respectively; and a thickness variation detection circuit detecting a variation in thickness of the recording medium according to the first and second detection signals and outputting a thickness variation signal indicative thereof; and a spherical aberration compensation element on the optical path between the optical path changer and the objective lens, driven according to the thickness variation signal from the thickness variation detection circuit to compensate for spherical aberration caused by the thickness variation of the recording medium.

* * * * *